United States Patent
Cook et al.

(10) Patent No.: US 7,997,133 B2
(45) Date of Patent: Aug. 16, 2011

(54) TEMPERATURE COMPENSATING SENSOR

(75) Inventors: Andrew Paul Cook, Amherst, NY (US); Norton G. Kinsley, Gasport, NY (US)

(73) Assignee: Kistler Holding AG, Winterthur (CH)

( * ) Notice: Subject to any disclaimer, the term of this patent is extended or adjusted under 35 U.S.C. 154(b) by 642 days.

(21) Appl. No.: 12/088,325

(22) PCT Filed: Oct. 11, 2006

(86) PCT No.: PCT/CH2006/000561
§ 371 (c)(1),
(2), (4) Date: Mar. 27, 2008

(87) PCT Pub. No.: WO2007/062532
PCT Pub. Date: Jun. 7, 2007

(65) Prior Publication Data
US 2008/0245149 A1 Oct. 9, 2008

Related U.S. Application Data

(60) Provisional application No. 60/727,398, filed on Oct. 18, 2005.

(51) Int. Cl.
*G01P 15/10* (2006.01)
*G01P 15/08* (2006.01)
(52) U.S. Cl. ............. 73/497; 73/514.29; 73/514.34
(58) Field of Classification Search .............. 73/497, 73/514.34, 514.29, 862.59, 1.38, 654
See application file for complete search history.

(56) References Cited

U.S. PATENT DOCUMENTS

| | | | | |
|---|---|---|---|---|
| 4,592,234 A | * | 6/1986 | Norling | 73/497 |
| 5,567,879 A | * | 10/1996 | Fima et al. | 73/514.29 |
| 5,677,485 A | * | 10/1997 | Nakamura | 73/497 |
| 5,834,650 A | * | 11/1998 | Kim | 73/651 |
| 6,111,338 A | | 8/2000 | Otsuchi et al. | |
| 6,227,051 B1 | | 5/2001 | Otsuchi et al. | |
| 6,739,190 B2 | * | 5/2004 | Hsu et al. | 73/497 |
| 6,769,305 B2 | * | 8/2004 | Baba et al. | 73/514.34 |
| 6,941,809 B2 | * | 9/2005 | Le Roy et al. | 73/497 |

FOREIGN PATENT DOCUMENTS

DE 19525147 1/1997

OTHER PUBLICATIONS

PCT/CH2006/000561—International Search Report Publication Date: Jun. 7, 2007.

* cited by examiner

*Primary Examiner* — Helen C. Kwok
(74) *Attorney, Agent, or Firm* — Dority & Manning, P.A.

(57) ABSTRACT

An acceleration sensor for measuring an acceleration comprises a housing including a measuring-plate, which has a first surface. The measuring plate has a second surface in parallel with and opposite to the first surface. A post is bonded via a post-bonding-face to the first surface. A temperature-compensating-element for compensating a temperature-effect caused by a temperature acting on the measuring-plate, is bonded via an element-bonding-face to the second surface of the measuring-plate. In addition, a sensor as described above is in a measuring device.

20 Claims, 4 Drawing Sheets

TEMPERATURE COMPENSATING SENSOR

CROSS-REFERENCE TO RELATED APPLICATIONS

This application claims priority to U.S. Provisional Patent Application Ser. No. 60/727,398, filed Oct. 18, 2005 and International Application Serial No. PCT/CH2006/000561 filed Oct. 11, 2006.

TECHNICAL FIELD

The Invention is related to a sensor, in particular to an acceleration sensor, as well as to a measuring device in accordance with the preamble of the respective independent claim.

BACKGROUND

A great variety of sensors for measuring an acceleration are well known from the state of the art.

Often, a known acceleration sensor for measuring an acceleration, in particular for measuring a vibration, such as acoustic vibrations or acoustic frequencies, typically consists of a housing comprising a measuring plate, especially a piezoelectric or piezoresistive bimorph-plate, which is bonded to a post by a glue, e.g. by an epoxy resin. Preferably, the aforementioned measuring-plate and post combination is coupled with a phenolic shield attached to the inside of the sensor's housing, surrounding the measuring-plate. This measure slows the heat from reaching the measuring-plate and reduces the temperature transient effects slightly, but does not avoid feigning an acceleration which is, in reality, actually not present.

To illustrate the problems with the prior art acceleration sensors, in FIG. 1a and FIG. 1b a prior art sensor is schematically represented which prior art sensor is designated in the following by the reference numeral 1'. Within the framework of the present patent application, all reference numerals related to the features of the prior art sensor 1' are supplied with a prime in order to distinguish the prior art sensor 1' clearly from a sensor in accordance with the present invention.

The sensor 1' according to FIG. 1a comprises a housing 2' in which housing 2' a measuring plate 3' is bonded at a first surface 4' via a post-bonding-face 61' to a post 6'. The post 6' is bonded to the measuring-plate 3' by a glue, in particular by an epoxy resin. The measuring-plate 3' is in the present example a bimorph measuring-plate 3', in particular a piezoelectric and/or a piezoresistive measuring-plate 3', comprising a first sub-plate 31' and a second sub-plate 32', and is polarized by a bending of the measuring-plate 3', which effect is actually well known to the person skilled in the art. The prior art sensor 1' according to FIG. 1a is displayed in the operating state. That is, an acceleration A is acting on the sensor 1' in the direction of the arrow D. Due to the acceleration A acting on the sensor 1', the measuring-plate 3' is bent in the opposite direction with respect to the direction D of the acceleration A. Thus, the acceleration meter 9' reads the acceleration A acting on the sensor 1'.

When there is no bending of the measuring plate 3' due to temperature effects, the acceleration meter 9' will display the correct value of the acceleration A acting on the sensor 1'.

In FIG. 1b the sensor 1' according to FIG. 1a is shown in the non-operating state, that is, no acceleration A is acting on the sensor 1' of FIG. 1b and the acceleration meter 9' should read zero.

But due to the temperature T acting on the housing 2' of the sensor 1', there is a certain amount of heat that is transferred via the post 6' to the measuring-plate 3'. A bending of the measuring-plate 3' occurs as a result of different coefficients of expansion of the post 6' and the measuring-plate 3', respectively. That is, a bending of the measuring-plate 3' occurs due to temperature transient effects. In other words, a temperature-effect A caused by the temperature T is not compensated.

As a result, the acceleration meter 9' reads an acceleration $A_T$, which is, in reality, actually not present. Thus, there is a bias voltage drift with temperature transients and, therefore the acceleration meter 9' does not display the correct acceleration A acting on the sensor 1', which acceleration is, in reality, zero in the example of FIG. 1b.

Thus, the known prior art sensor 1' does not provide exact acceleration measurement data in case that the sensor 1' is exposed to any temperature effect, e.g. to temperature changes in its environment.

BRIEF OBJECTS AND SUMMARY OF THE INVENTION

Starting from the prior art, it is therefore the object of the present invention to provide a sensor, in particular an accelerometer, allowing exact measuring of acceleration, in particular for measuring vibrations and/or frequencies, independent from temperature effects.

The subject matters of the invention which satisfy these objects are characterized by the features of the respective independent claims.

The dependent claims relate to particularly advantageous embodiments of the invention.

In accordance with the present invention, a sensor is thus provided, in particular an acceleration sensor for measuring an acceleration, comprising a housing including a measuring-plate, having a first surface and in parallel with and opposite to said first surface a second surface, wherein a post is bonded via a post-bonding-face to the first surface. A temperature-compensating-element for compensating a temperature-effect caused by a temperature acting on the measuring-plate, is bonded via an element-bonding-face to the second surface of the measuring-plate.

Due to the fact that the measuring-plate, which is made of a piezoelectric and/or a piezoresitive material, and the post, consisting of an other material, e.g. comprising a metal or a phenolic material, have different coefficients of expansion, a bending of the measuring-plate will occur caused by a temperature acting on the measuring plate and/or on the post of the sensor, if no temperature-compensating-element is provided as suggested by the present invention.

It is thus essential to the present invention that a temperature compensating element is provided compensating a temperature effect acting on the measuring plate of the sensor, in particular a temperature effect caused by different thermal coefficients of expansion of the post and the measuring-plate, respectively.

In a preferred embodiment, the post and/or the temperature-compensating-element is symmetrically bonded to the measuring-plate with respect to at least one mirror-plane of said measuring-plate.

In a further, very important embodiment the post-bonding-face of the post and the element-bonding-face of the temperature-compensating-element are identical, both, in shape and surface area. Such an arrangement ensures an exact compensation of temperature effects due to different thermal coefficients of expansion. The measuring-plate is preferably a piezoelectric and/or a piezoresitive measuring-plate for measuring an acceleration and/or mechanical forces and/or a mechanical pressure and the measuring-plate is especially a multi-morph measuring plate, in particular a bimorph measuring-plate.

To compensate very small temperature effects and to ensure an extreme precise acceleration measurement, a temperature-decoupling-shield, in particular a phenolic shield, is additionally provided in an inside of the housing of the sensor, in order to decouple the measuring-plate from temperature-effects, in particular from very small temperature effects.

In another embodiment which is very important in practice, the housing itself is a phenolic shielding, comprising the post and the temperature-compensating-element, in particular a phenolic post and/or a phenolic temperature-compensating-element, and more specifically, the housing is shaped as a phenolic pill, especially as a symmetrically shaped phenolic pill.

The post and/or the temperature-compensating-element is preferably bonded to the measuring-plate by a glue, in particular by an epoxy, in more particular by an epoxy resin, for example an epoxy resin paint, an epoxy casting resin, an epoxy glass resin or another capable glue.

The invention is furthermore related to an acceleration measuring device and/or vibration measuring device and/or acoustic measuring/device and or a device for measuring frequencies, in particular acoustic frequencies in a range from 0 Hz to 300 Hz, more particular for measuring frequencies at low amplitudes comprising a sensor in accordance with the invention as described in the present description.

BRIEF DESCRIPTION OF THE DRAWINGS

In the following, the invention will be explained in more detail with reference to the drawings. There are shown in a schematic representation.

DETAILED DESCRIPTION OF THE EMBODIMENTS

Figure 1A:
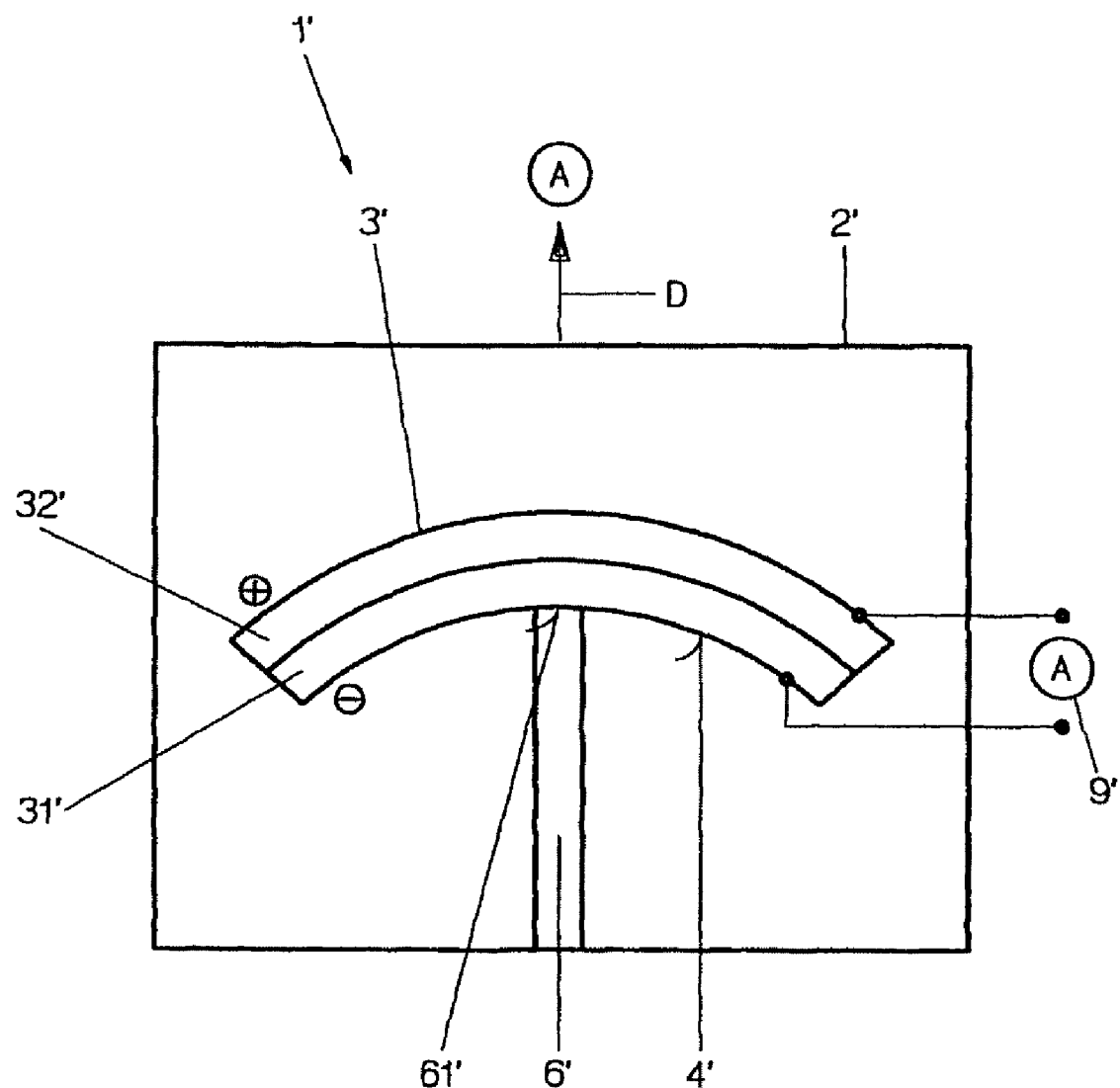
FIG. 1a an acceleration sensor as known from the state of the art.
Figure 1B:
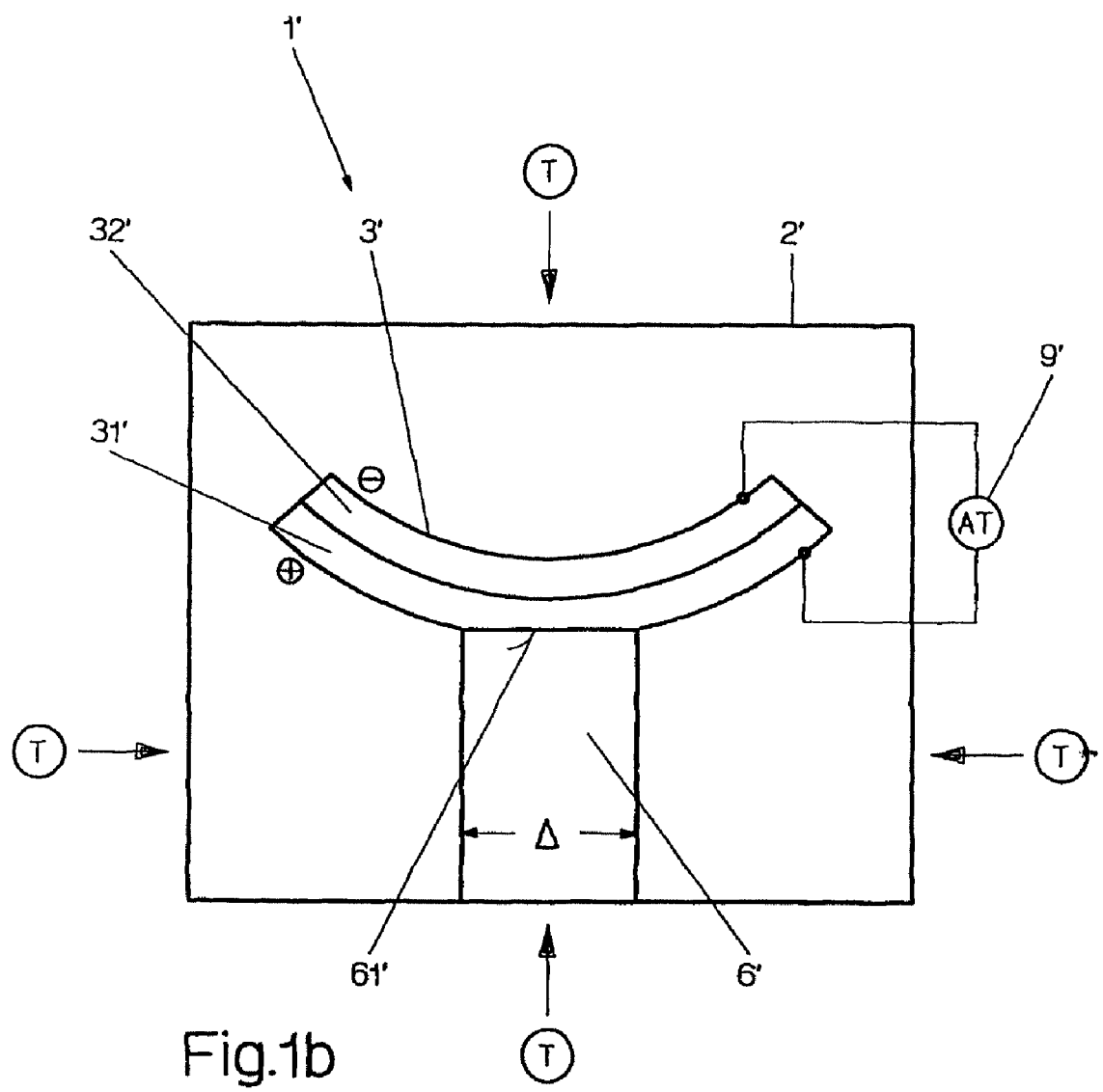
FIG. 1b a sensor in accordance with FIG. 1a being influenced by a temperature.

Both FIG. 1a and FIG. 1b show schematically an acceleration sensor as well known from the state of the art. FIG. 1a and FIG. 1b are already discussed in the introductory part of the present description.

The sensor in accordance with the present invention, which is designated overall in the following by the reference numeral 1, is schematically shown, in section, in FIG. 2. The acceleration sensor 1 is a sensor 1 for measuring an acceleration A, in particular for measuring a vibration, especially acoustic vibrations and/or acoustic frequencies, in more particular a sensor 1 for measuring acoustic frequencies/and or vibrations in a range from 0 Hz to at least 200 MHz, especially in a range from 0 Hz to 100 kHz, in more particular in a range from 0 Hz to 300 Hz.

Figure 2:
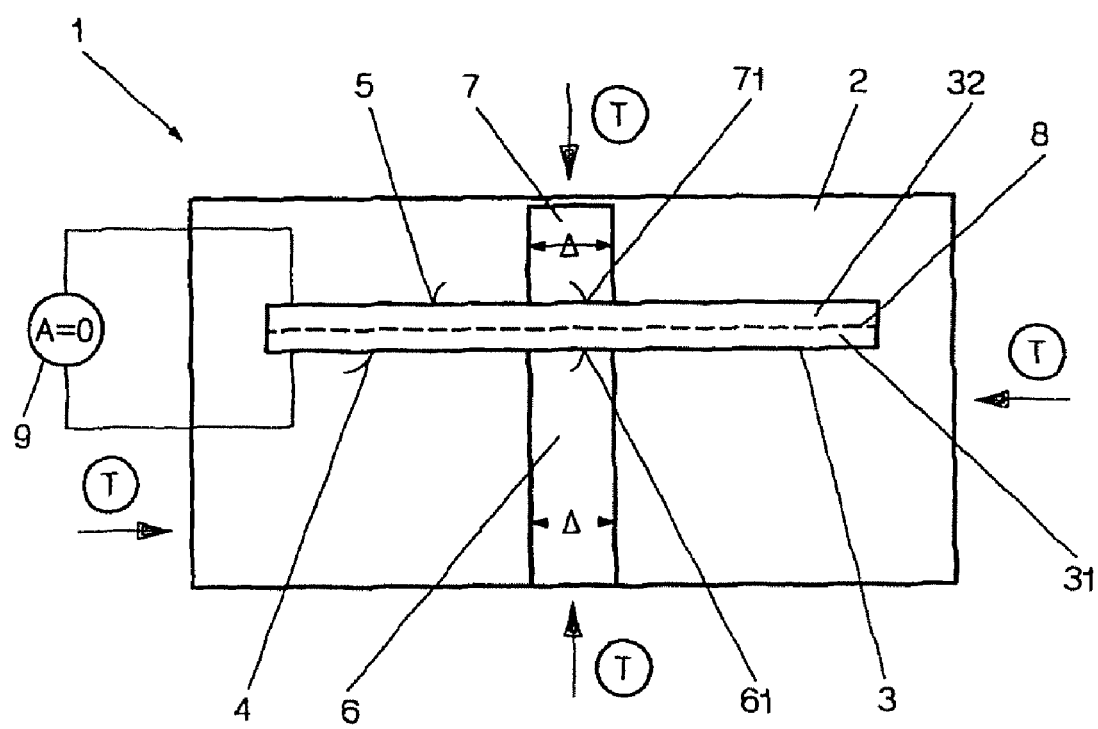
FIG. 2 a sensor in accordance with the invention.

The sensor 1 in accordance with FIG. 2 comprises a housing 2 in which housing 2 a measuring plate 3 is bonded at a first surface 4 via a post-bonding-face 61 to a post 6. In accordance with the invention, a temperature-compensating-element 7 is bonded via an element-bonding-face 71 to a second surface 5 of the measuring-plate 3, which second surface 5 is in parallel and opposite to said first surface 4 of the measuring-plate 3. In the special embodiment shown in FIG. 2, the post-bonding-face 61 of the post 6 and the element-bonding-face 71 of the temperature-compensating-element 7 are identical, both, in shape and surface area.

The measuring-plate 3 is in the present example a bimorph measuring-plate 3, comprising a first sub-plate 31 and a second sub-plate 32, which can be polarized in a different way by a bending of the measuring-plate 3, which effect is actually well known to the person skilled in the art. The measuring-plate 3 is in particular a piezoelectric and/or a piezoresistive measuring-plate 3, and, in a special embodiment of the invention, the measuring-plate 3 is a multi-morph measuring-plate 3 comprising more than two piezoelectric and/or piezoresistive sub-plates 31, 32. It is understood, that, in a very special embodiment, the measuring-plate 3 may comprise only one sub-plate 31.

Both, the post 6 and the temperature-compensating-element 7 are preferably bonded to the measuring-plate 3 by a glue, in particular by an epoxy, in more particular by an epoxy resin, for example an epoxy resin paint, an epoxy casting resin, an epoxy glass resin or an other capable glue.

In a preferred embodiment, the post 6 and/or the temperature-compensating-element 7 and/or the housing 2 of the sensor 1 are made of a phenolic material, and in more particular the housing 2, including the post 6 and the temperature-compensating-element 7 for compensating a temperature-effect A, is shaped as a phenolic pill 2, especially as a symmetrically shaped phenolic pill 2 comprising the measuring-plate 3.

It is understood, that the sensor 1 in accordance with the invention may be made of other suitable materials, such as a metal or a plastic material or an other suitable material, and the sensor 1 may comprise further necessary components such as electronic and/or further mechanical components. Said further components as well as their arrangement and function in connection with an acceleration sensor 1 is well known to the person skilled in the art and, thus, there is no need to discuss the structure of an acceleration sensor 1 as such in greater detail.

In the present example, no acceleration A, that is no force and/or no vibration and/or no other acceleration A is acting on the sensor 1.

Although a temperature T is acting on the housing 2 of the sensor 1, that is a certain amount of heat is transferred via the housing 2 and/or the post 6 and/or the temperature compensating-element 7 to the measuring-plate 3, no bending occurs due to a change of temperature T, i.e. no bending of the measuring-plate 3 occurs due to temperature transient effects. In other words, according to the invention, the temperature-compensating-element 7 compensates any temperature-effect A caused by the temperature T acting on the measuring-plate 3.

Thus, there is no bias voltage V drift with temperature transients and, therefore, the acceleration meter 9 reads zero, in accordance with the actual acceleration A which is, indeed, zero.

Figure 3:
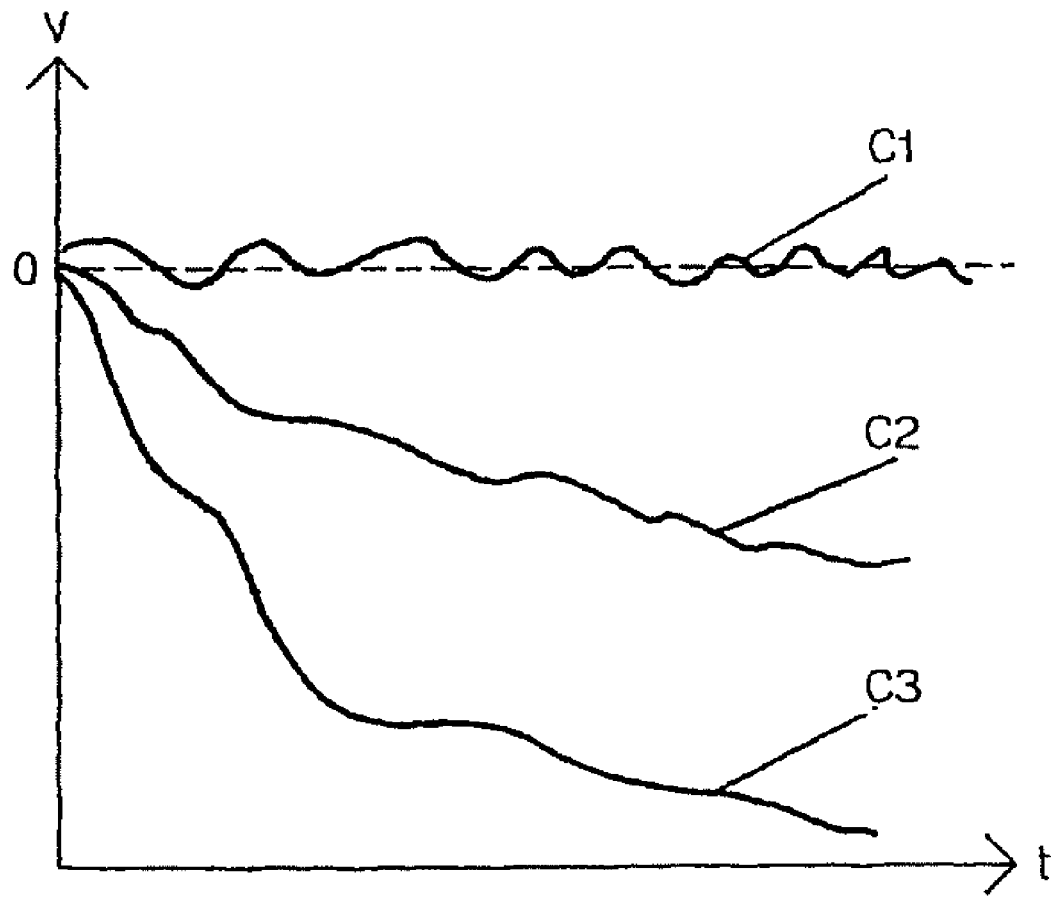
FIG. 3 a schematic graph demonstrating results of transient temperature tests.

In FIG. 3 a schematic graph is displayed showing the results of temperature testing of a sensor 1 in accordance with the present invention, compared to the results of temperature testing of two sensors 1' known from the state of the art.

The axis of ordinates, which is the V-axis, displays the Bias Voltage V in arbitrary units which is produced by a measuring-plate 3 of a sensor 1 and by the measuring-plate 3' of sensors 1', respectively, caused by a temperature T acting on the sensors 1, 1' containing said measuring-plates 3, 3'.

Curve C3 represents the time t dependence of the bending of a measuring-plate 3' of a sensor 3 which has a metal housing 2', which sensor 1' does not include any temperature shielding means, such as e.g. a phenolic shielding as known from the state of the art. Dependent on time, the Bias Voltage V Curve C3 drops dramatically according to a strong bending of the measuring-plate 3' of the respective prior art sensor 1'.

Curve C2 is related to the time t dependence of the bending of a measuring-plate 3' being placed in a second prior art sensor 1', which second prior art sensor 1' includes a temperature shielding means, such as a phenolic shielding known from the state of the art. The time dependent decrease of curve C2 is less than the time t dependent drop of curve C3, but the time dependency of curve C2 also clearly shows the temperature-effect A caused by the temperature T acting on the measuring-plate 3' of the second prior art sensor 1'.

That is, although the second prior art sensor 1' includes a temperature shielding means, in particular a phenolic shielding, the measuring-plate 3' of the second prior art sensor 1' is bended due to the temperature T and/or the respective heat being transferred through the housing 2' of the sensor 1' to the measuring plate 3'.

That is, caused by the temperature T acting on the measuring-plates 3' of the prior art sensors 1', the prior art sensors 1' feign an acceleration A which is, in reality, actually not present.

As a result, using a prior acceleration sensor 1', acceleration measurements are dramatically distorted due to temperature-effects A caused by the temperature T acting on the measuring-plate 3' of the second prior art sensor 1'.

To the contrary, Curve C1 is related to the time t dependence of the bending of a measuring-plate 3 being placed in a sensor 1 in accordance with the present invention. Apart from more or less statistic interferences of very low amplitude, no distortion due to temperature-effects A caused by the temperature T acting on the measuring-plate 3 can be observed.

As a result, a sensor 1 comprising a temperature-compensating-element 7 according to the present invention, will provide exact acceleration measurement data even if the sensor 1 is exposed to excessive temperature effects, e.g. to excessive temperature changes in its environment and/or if big differences between the thermal coefficients, e.g. between the thermal coefficient of expansion, between the post 6 and the measuring-plate 3 are present.

LIST OF REFERENCE NUMERALS

Reference Numerals of Drawings Related to the Invention 1 sensor
2 housing
3 measuring-plate
31 first sub-plate
32 second sub-plate
4 first surface
5 second surface
6 post
61 post-bonding-face
7 temperature compensating-element 71 element-bonding-face
8 mirror-plane
9 acceleration meter
A acceleration
$A_T$ acceleration display due to temperature effects
C1 curve, prior art sensor
C2 curve, prior art sensor
C3 curve, sensor in accordance to the invention
t time
T temperature
V Bias Voltage
Δ temperature-effect Reference Numerals Related to Features of a Prior Art Sensor 1' sensor
2' housing
3' measuring-plate 31' first sub-plate
32' second sub-plate
4' first surface
6' post
61' post-bonding-face
9' acceleration meter

What we claim is:

1. A sensor, comprising
a housing including a measuring-plate, the measuring-plate having a first surface and a second surface disposed parallel with and opposite to said first surface,
a post which is mounted to the inside of the housing is bonded via a post-bonding-face to the first surface,
a temperature-compensating-element for compensating a temperature-effect caused by a temperature acting on the measuring-plate is bonded via an element-bonding-face to the second surface of the measuring-plate, the temperature-compensating-element being disposed away from contact with the housing and away from contact with all other components within the housing of the sensor.

2. Sensor in accordance with claim 1, wherein the post is symmetrically bonded to the measuring-plate with respect to at least one mirror-plane of said measuring plate.

3. Sensor in accordance with claim 1, wherein the temperature-compensating-element is symmetrically bonded to the measuring-plate with respect to at least one mirror-plane of said measuring-plate.

4. Sensor in accordance with claim 1, wherein the post-bonding-face of the post and the element-bonding-face of the temperature-compensating-element are identical, both, in shape and surface area.

5. Sensor in accordance with claim 1, wherein the measuring-plate is a piezoelectric measuring-plate for measuring one of an acceleration, mechanical forces and mechanical pressure.

6. Sensor in accordance with claim 1, wherein the measuring-plate is a multi-morph measuring plate.

7. Sensor in accordance with claim 1, wherein a temperature-decoupling-shield, in particular a phenolic shield, is provided in an inside of the housing of the sensor, in order to decouple the measuring-plate from temperature-effects.

8. Sensor in accordance with claim 1, wherein the housing is a phenolic shielding, comprising the post and the temperature-compensating-element, in particular a phenolic post and/or a phenolic temperature-compensating-element.

9. Sensor in accordance with claim 1, wherein each of the post and the temperature-compensating element is bonded to the measuring-plate by a glue.

10. A device for measuring frequencies, comprising a sensor in accordance with claim 1.

11. A sensor in accordance with claim 2, wherein the temperature-compensating-element is symmetrically bonded to the measuring-plate with respect to at least one mirror-plane of said measuring-plate.

12. Sensor in accordance with claim 2, wherein the post-bonding-face of the post and the element-bonding-face of the temperature-compensating-element are identical, both, in shape and surface area.

13. Sensor in accordance with claim 3, wherein the post-bonding-face of the post and the element-bonding-face of the temperature-compensating-element are identical, both, in shape and surface area.

14. Sensor in accordance with claim 1, wherein the measuring-plate is a piezoresitive measuring-plate for measuring one of an acceleration, mechanical forces and mechanical pressure.

15. Sensor in accordance with claim 2, wherein the measuring-plate is a piezoelectric measuring-plate for measuring one of an ac-celebration, mechanical forces and mechanical pressure.

16. Sensor in accordance with claim 2, wherein the measuring-plate is a piezoresitive measuring-plate for measuring one of an acceleration, mechanical forces and mechanical pressure.

17. Sensor in accordance with claim 2, wherein the measuring-plate is a multi-morph measuring plate.

18. Sensor in accordance with claim 2, wherein a temperature-decoupling-shield, in particular a phenolic shield, is disposed inside of the housing of the sensor so as to decouple the measuring-plate from temperature-effects.

19. Sensor in accordance with claim 1, wherein the housing is a symmetrically shaped phenolic pill, the post is a phenolic post and the temperature-compensating-element is a phenolic temperature-compensating-element.

20. Sensor in accordance with claim 1, wherein each of the post and the temperature-compensating element is bonded to the measuring-plate by one of an epoxy, an epoxy resin, an epoxy resin paint, an epoxy casting resin, and an epoxy glass resin.

\* \* \* \* \*